G. T. SMITH.
PURIFIER.
APPLICATION FILED SEPT. 16, 1910.
994,280.
Patented June 6, 1911.
2 SHEETS—SHEET 1.
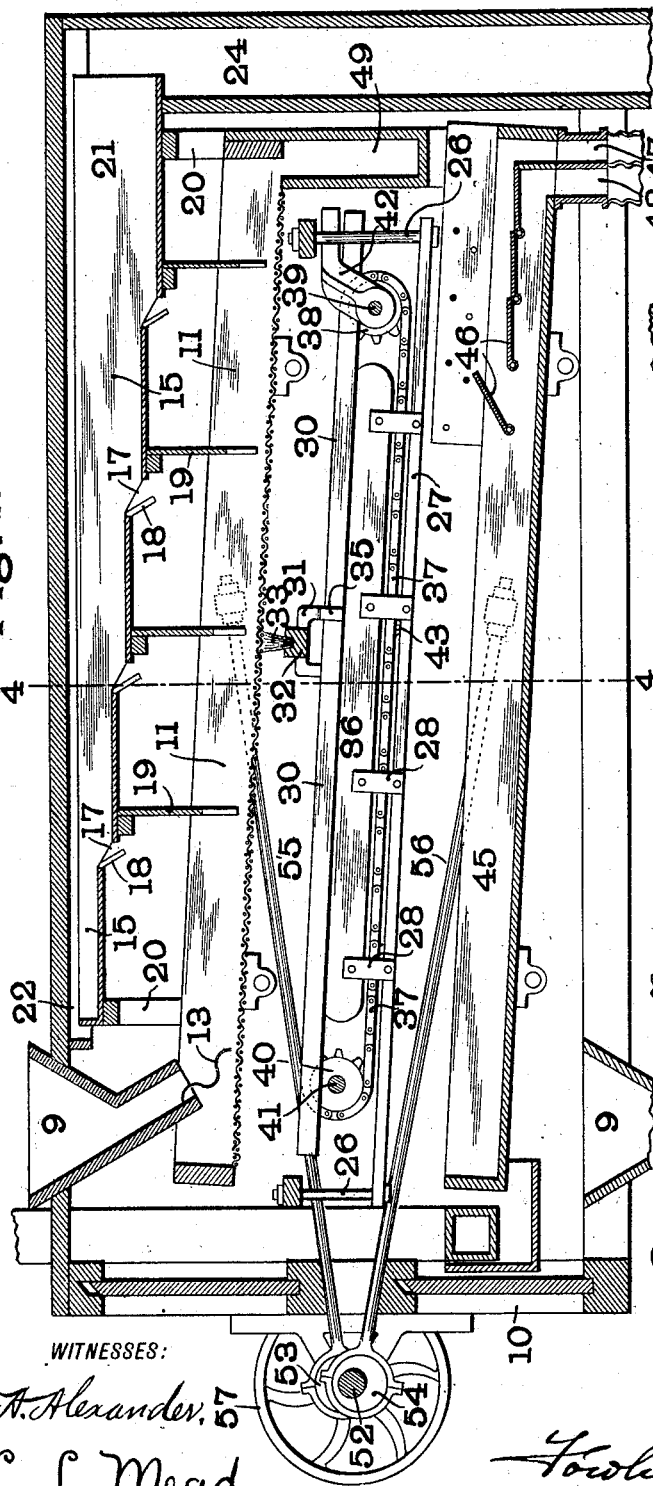
Fig. 1.
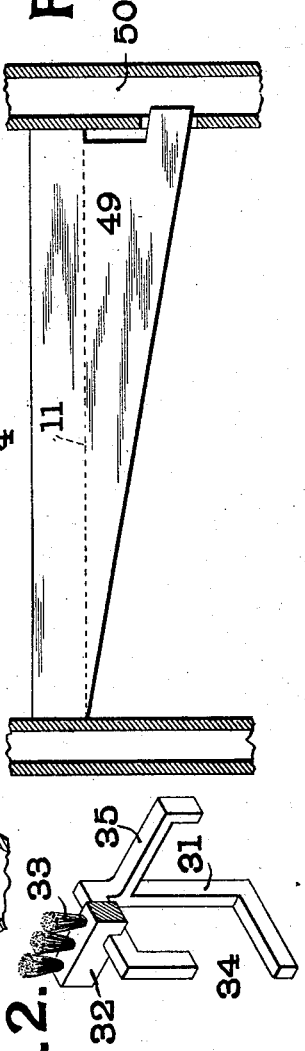
Fig. 2.
Fig. 3.
WITNESSES:
W. A. Alexander
L. L. Mead.
INVENTOR
George T. Smith
BY
Fowler & Huffman
ATTORNEYS

G. T. SMITH.
PURIFIER.
APPLICATION FILED SEPT. 16, 1910.

994,280.

Patented June 6, 1911.

2 SHEETS—SHEET 2.

WITNESSES:
W. H. Alexander.
L. L. Mead.

INVENTOR
George T. Smith
BY
Fowler & Huffman
ATTORNEYS

UNITED STATES PATENT OFFICE.

GEORGE T. SMITH, OF SPRINGFIELD, MISSOURI, ASSIGNOR TO GEORGE T. SMITH MIDDLINGS PURIFIER COMPANY, OF SPRINGFIELD, MISSOURI, A CORPORATION OF MISSOURI.

PURIFIER.

994,280.  Specification of Letters Patent.  Patented June 6, 1911.

Application filed September 16, 1910. Serial No. 582,323.

*To all whom it may concern:*

Be it known that I, GEORGE T. SMITH, a citizen of the United States, residing at Springfield, Missouri, have invented a certain new and useful Purifier, of which the following is such a full, clear, and exact description as will enable any one skilled in the art to which it appertains to make and use the same, reference being had to the accompanying drawings, forming part of this specification.

My invention relates to a purifier for use in flouring mills and the object of my invention is to improve the mechanical construction of the purifier and also to render it more efficient for the purpose for which it is to be used.

Figure 4:
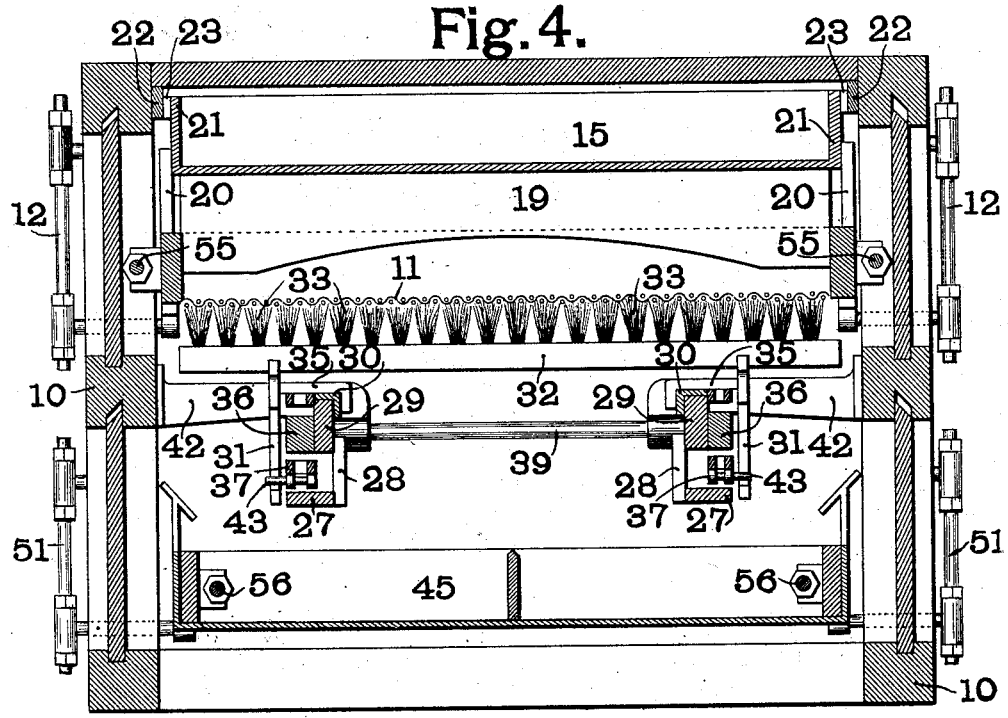
Figure 5:
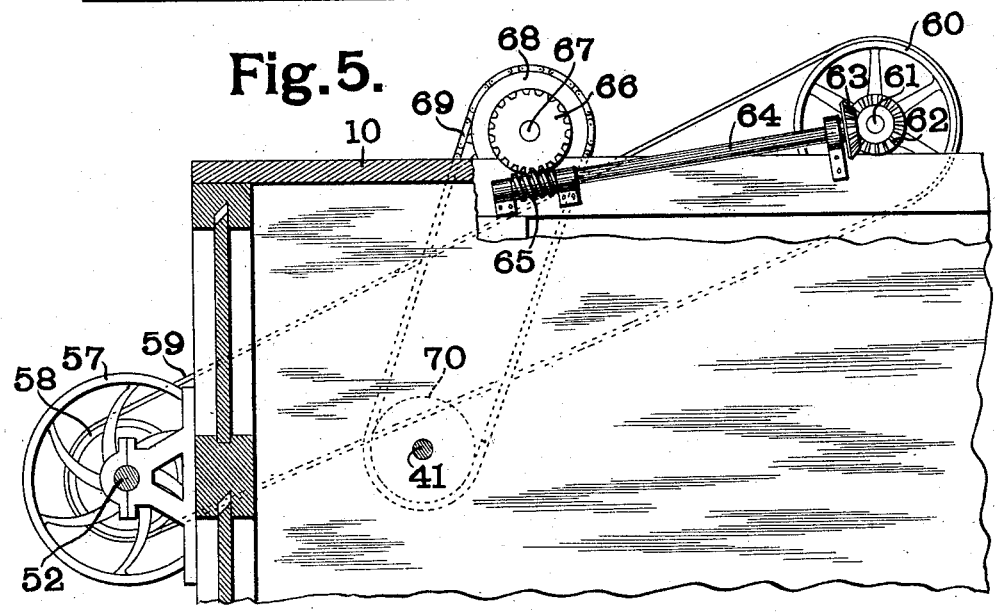

In the accompanying drawings which illustrate one form of purifier made in accordance with my invention Figure 1 is a vertical longitudinal section; Fig. 2 is a perspective view of one of the brackets for carrying the cleaning brush; Fig. 3 is a rear view of a portion of the purifier; Fig. 4 is a cross section on the line 4—4 of Fig. 1 and Fig. 5 is a side view showing the gearing for driving the mechanism of the purifier.

Like marks of reference refer to similar parts in the several views of the drawings.

10 represents the casing of the purifier. Within the casing 10 is a reciprocating sieve 11 suspended by means of hangers 12, as shown in Fig. 4. The sieve 11 is supplied with the ground material by means of a hopper 9 having at its lower end a corrugated distributing board 13. Arranged above the sieve 11 is an air trunk composed of a lower part 15 arranged in the form of steps and movable relatively to the top of the casing 10 which top also serves as the top of the air trunk 15. At the end of each step the trunk 15 is provided with an air passage 17 controlled by an adjustable valve 18. Adjacent to each of the openings 17 is a partition 19 which extends downwardly into the sieve 11. The lower or movable part 15 of the air trunk is carried by the sieve 11 by means of uprights 20, as shown in Figs. 1 and 4. Adjacent to the side walls 21 of the air trunk 15 the casing 10 is provided with bars 22 covered with lamb's wool 23 or other suitable material for making a joint between the two parts which will prevent the passage of the fine dust and which will at the same time allow the two parts to readily move relative to each other. The end of the air trunk 15 projects through an opening into a passage 24 leading to a suitable exhaust pipe.

Arranged below the sieve 11 is a frame work carried by means of bolts or rods 26. These bolts or rods 26 engage with longitudinal bars 27 which by means of braces 28 carry upper bars 29 upon which are angle irons 30 which form a track for brackets carrying the brush for cleaning the end plates of the sieve 11. These brackets shown in detail in Fig. 2, each consists of a rectangular portion 31 carrying the cross bar 32 in which the bristles 33 of the brush are mounted. This frame 31 is provided with a cut-away portion 34 for a purpose to be hereinafter described. Each of the brackets is also provided with an arm 35 which projects over and runs upon the angle iron 30. The upper part 29 hereinbefore referred to has secured to it a second bar 36 around which passes the endless chain 37 for driving the brush 33. The chain 37 is provided with pins 43, as best shown in Fig. 4, which pins engage with the frame 31 of the bracket to move the brush 33. This endless chain 37 passes around sprocket wheels 38 on a rear shaft 39 and sprocket wheels 40 on a front shaft 41. The rear shaft 39 is supported by means of brackets 42 and does not project beyond the frame as is shown in Fig. 4. The brackets 31 therefore do not come in contact with the shaft 39 and the cut-away portions 34 of these brackets allow them to pass beyond the shaft 41.

Arranged below the frame carrying the cleaning brush is a reciprocating conveyer 45 which is provided near its rear end with a partition formed of movable members or valves 46 in the usual and well known manner. The material falling from the sieve 11 into the conveyer 45 may be thus divided into two parts which pass out separately through discharge openings 47 and 48. The material which fails to fall through the sieve 11 is discharged through a passage 49, shown in detail in Fig. 3, into a side passage 50 arranged at one side of the air passage 24. The conveyer 45 is suspended from hangers 51 similar to the hangers 12 hereinbefore described. Motion is imparted to the conveyer 45 and sieve 11 by means of a shaft 52 arranged at the end of the machine and provided with eccentrics 53 and 54 respectively, from which rods 55 and 56 run to the said sieve and conveyer, as shown in Fig. 1 of the drawings. Motion is imparted to the shaft 52 by means of a pulley wheel 57. The shaft 52 is also provided with a smaller pulley 58 around which passes a belt 59 extending to a pulley 60 on a shaft 61. This shaft 61 is provided with a beveled gear-wheel 62 meshing with a second beveled gear-wheel 63 on a shaft 64. This shaft 64 carries a worm 65 meshing with a worm wheel 66 on a shaft 67. This shaft 67 extends across the casing 10 and carries a sprocket wheel 68 around which passes a sprocket chain 69. This chain 69 also passes around a sprocket wheel 70 on the shaft 41 and thus drives the sprocket chain forming the driving means for the cleaning brush.

The operation of my purifier will be evident from the above description.

The material is fed through the hopper 9 to the sieve 11 to which reciprocating motion is imparted by means of the rod 55. The material passes down through the sieve into the conveyer 45 while the fine dust is removed by means of the current of air passing over the material and into the air trunk 15. As the lower part of the air trunk 15 reciprocates with the sieve 11 the light material which might otherwise clog the air trunk is kept in motion so that it will be drawn out by means of the current of air. This result is greatly facilitated by the formation of the air trunk in two parts which are movable relative to each other and at the same time this construction allows the movable part of the air trunk to be made very light. After the passage of the material through the sieve 11 it is separated by means of the partition 46 in the conveyer 45 and is delivered through the discharge passages 47 and 48 to be further operated upon by any suitable mechanism.

Having fully described my invention, what I claim as new and desire to secure by Letters Patent of the United States is:

1. In a purifier, the combination with a reciprocating sieve, of an air trunk above said sieve and separated therefrom, the top of said air trunk being stationary and the lower part movable relatively thereto, and means for reciprocating said lower part.

2. In a purifier, the combination with a reciprocating sieve, of an air trunk above said sieve and separated therefrom, the top of said trunk being stationary and the lower part being carried by said sieve and reciprocating therewith.

3. In a purifier, the combination with a reciprocating sieve, of an air trunk above said sieve and separated therefrom, the top of said air trunk being formed by the top of the casing, and the lower part being movable relatively thereto.

4. In a purifier, the combination with a reciprocating sieve, of an air trunk above said sieve and separated therefrom, the top of said air trunk being formed by the top of the casing, and the lower part of said trunk being carried by said sieve and movable therewith.

5. In a purifier, the combination with a frame, of a pair of shafts extending across said frame, one only of said shafts extending beyond said frame, an endless chain carried by said shafts, a bracket carried by said chain and open at one end to allow the passage of the extending shaft, a brush carried by said bracket, and means for driving said bracket from said chain.

6. In a purifier, the combination with a frame, said frame consisting of upper and lower bars, of a pair of shafts extending across said frame, one only of said shafts extending beyond the frame, an endless chain carried by said shafts and passing around said upper bar, open ended brackets sliding on said upper bar, a brush carried by said brackets, and means for driving said brackets from said endless chain.

In testimony whereof, I have hereunto set my hand and affixed my seal in the presence of the two subscribing witnesses.

GEORGE T. SMITH. [L. S.]

Witnesses:
 WALTER CRUTCHER,
 J. M. WILKERSON.

---

Copies of this patent may be obtained for five cents each, by addressing the "Commissioner of Patents, Washington, D. C."